United States Patent

Peiris

[11] Patent Number: 6,075,083
[45] Date of Patent: Jun. 13, 2000

[54] MOULDABLE COMPOSITION AND PROCESS

[75] Inventor: Dunstan Haridra Peiris, Singapore, Singapore

[73] Assignee: Ceramet Technologies PTE. Ltd., Singapore, Singapore

[21] Appl. No.: 09/037,150

[22] Filed: Mar. 9, 1998

[30] Foreign Application Priority Data

Dec. 15, 1997 [SG] Singapore .......................... 9704461-4

[51] Int. Cl.[7] .................. C08J 3/00; C08K 3/08
[52] U.S. Cl. .................. 524/439; 524/593; 524/444; 524/442; 524/557
[58] Field of Search .................. 524/439, 593, 524/444, 442, 557

[56] References Cited

U.S. PATENT DOCUMENTS 4,239,676  12/1980  Wilkinson et al. ............... 524/420
4,765,950  8/1988  Johnson ............................ 419/2
5,215,946  6/1993  Minh ............................... 501/97.1

OTHER PUBLICATIONS

Encyclopedia of Polymer Science and Engineering, 2nd Ed., Wiley–Interscience Publication, vol. 17, p. 136, pp. 157–158, 1989.

ASTM Material Engineering Dictionary, Edited by J. R. Davis, The Material Information Society, p. 416, Dec. 1992.

Primary Examiner—Robert A. Dawson
Assistant Examiner—Kuo-Liang Peng
Attorney, Agent, or Firm—Ladas & Parry

[57] ABSTRACT

There is provided a mouldable composition for use in manufacturing a sintered metal or ceramic object, the composition comprising a metal or ceramic powder, a cross-linkable thermoplastic polymer and an amount of a cross-linking agent effective to cross-link the thermoplastic polymer at an elevated temperature. There is also provided a process for manufacturing a sintered metal or ceramic object using such a mouldable composition.

7 Claims, 1 Drawing Sheet

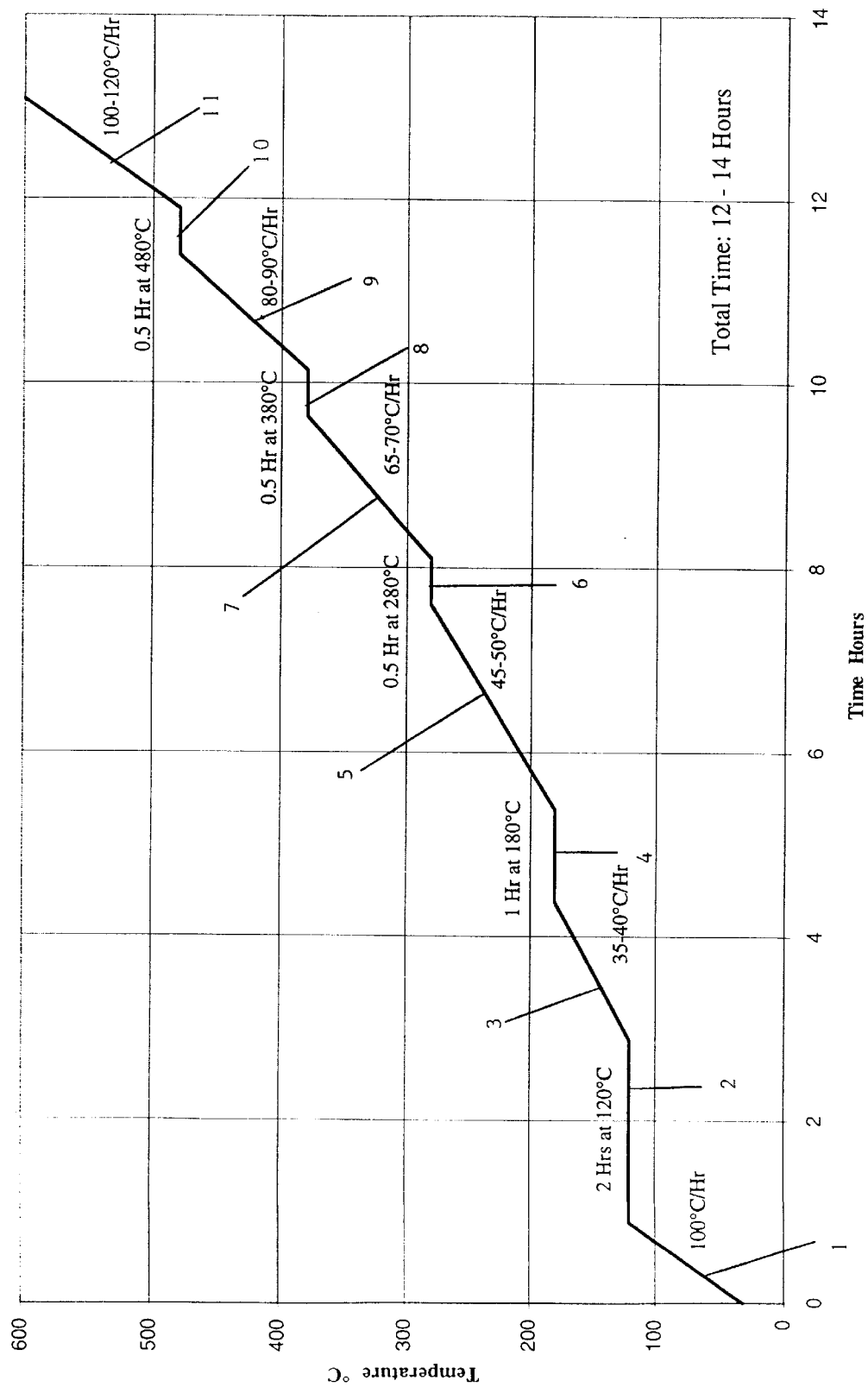
Figure 1: Typical Temperature - Time Heating Profile

MOULDABLE COMPOSITION AND PROCESS

TECHNICAL FIELD

The present invention relates to a polymeric mouldable composition which at lower temperature behaves as a mouldable thermoplastic material and at higher temperature as a thermosetting material. The present invention also relates to a process for producing a metal or ceramic object, using such a polymeric mouldable composition.

BACKGROUND OF THE INVENTION

The processing of particulate materials into solid bodies is a known technique, described, for example, in the following patent specifications: U.S. Pat. Nos. 4,113,480, 4,305,756, 4,544,694, 4,661,315, 4,765,950, 5,006,164, 5,122,326, 5,240,513 and 5,337,531, European patent nos. 0324122 and 0409646, and Japanese patent application nos. 59-121150 and 365552. Metal powders are compounded with a binder system and shaped by injection moulding. The binder is then removed from the moulded green body prior to sintering into a solid component. The binder systems that are used in the prior art are progressively softenable and are removed using heat or partial dissolution in solvents with subsequent heating. These methods are always associated with the use of a thermoplastic polymer, having a thermoplastic behaviour throughout the heating cycle. The thermoplastic polymer becomes quite soft during the initial heating cycle which is initiated to remove wax based binder components through melting, and increases in softness as the temperature increases. As a result of this increasing softness the polymer reaches a stage where it cannot support the metal or powder effectively to retain the shape of the part, thus causing distortion, deformation defects in the parts. This also limits the shapes of the parts that can be processed using processes of the prior art. Furthermore this also limits the type, size or shapes of metal powders that can be used in the processes of the prior art. In order to reduce the effect of softening of a thermoplastic polymer binder, the use of fine powders, typically less than 10 $\mu$m in size, and irregular shape have been suggested. It may also be necessary to prolong the heating cycle, often to uneconomical lengths. Both these have a serious impact on the quality, economy, usage of material and the size of the processable parts. Furthermore the decomposition of the binder as it moves through an increasingly soft phase can leave residual products that contaminate the metal or ceramic particulate material. Processes of the prior art also require the shape of the powder particles to be partially irregular or irregular when larger particle size (up to 10 $\mu$m) powders are used, but spherical or near spherical when smaller sized powders are used. This is in order to take advantage of some packing of the particles due to interlocking of irregular shapes, or the high surface energy of fine spherical particles, to bond the particles together. This unquantifiable packing and energy behaviour lead to unpredictable deviations of the final product properties.

Accordingly, there is a need for an improved binder composition for use in forming solid bodies from particulate materials.

Furthermore in prior art processes binder compositions for metals differ from binder compositions for ceramics. There is therefore a need for a binder composition that can be used for processing metal and ceramic powders.

SUMMARY OF THE INVENTION

The present invention is directed towards addressing overcoming the problems of the prior art as indicated above, by providing a binder system that offers the green part excellent mouldability during moulding and provides excellent shape retention during the binder removal process. The binder is formulated to provide the above characteristics and can be used with metallic and ceramic particulate powders without having to operate within a narrow band of particulate material characteristics, specially with respect to powder particle size and shape. In the binder of the present invention the thermoplastic polymer is rigidised during a heating phase through cross-linking and is transformed into a thermoset polymer. The rigid and strong thermoset polymer retains the shape of the component during heating until neck formation between the powder particles has commenced. In the case of larger particle sizes, for example up to 40 $\mu$m, the neck formation takes place at higher temperatures. The rigid polymer retains the shape of the article until the neck formation has progressed sufficiently for the article to retain its shape without the aid of the polymeric binder. In the prior art the thermoplastic polymer progressively softens and fails to retain the shape until the necks are formed. As such it is not possible to increase the particle size beyond typically 10 $\mu$m in prior art processes.

The present invention further provides a binder system that during the binder removal process, when subjected to heat, progressively hardens through cross-linking, thus imparting excellent shape retention. The hardening progresses until the polymer begins to degrade at a higher temperature by gradually and progressively breaking down into gaseous products. The polymer therefore does not undergo a state softening. The degradation is completed after the metal powder particles have formed stable necks or links among them.

Thus, according to a first embodiment of the invention, there is provided a mouldable composition for use in manufacturing a sintered metal or ceramic object, said composition comprising a metal or ceramic powder, a cross-linkable thermoplastic polymer and an amount of a cross-linking agent effective to cross link said thermoplastic polymer at an elevated temperature.

The invention also provides a moulded green part comprising a mouldable composition of the first embodiment.

According to a second embodiment of the invention, there is provided a process for manufacturing a sintered metal or ceramic object, the process comprising:

(a) compounding forming a mouldable composition comprising a metal or ceramic powder, a cross-linkable thermoplastic polymer and an amount of a cross-linking agent effective to cross-link said thermoplastic polymer at an elevated temperature, said compounding occurring at a temperature less than said elevated temperature;

(b) injecting said mouldable composition at a first temperature less than said elevated temperature into a mould to form a moulded green part;

(c) raising the temperature of said moulded green part to a second temperature above said elevated temperature to cross-link said thermoplastic polymer, thereby forming a thermoset polymer;

(d) raising the temperature of said moulded green part to a third temperature sufficient to cause neck formation between particles of said metal or ceramic powder; and (e) heating said moulded green part at a temperature sufficient to degrade said thermoset polymer and sinter said metal or ceramic powder, thereby forming said sintered metal or ceramic object.

Suitably, in the process of the second embodiment, step (e) comprises the steps of (i) heating the moulded green part at a fourth temperature sufficient to at least partly degrade the thermoset polymer and (ii) raising the temperature of the moulded green part to a fifth temperature sufficient to sinter the metal or ceramic powder, thereby forming the sintered metal or ceramic object.

BRIEF DESCRIPTION OF THE DRAWING

FIG. 1 is a typical temperature-time heating profile used in a process of the present invention.

DETAILED DESCRIPTION OF THE INVENTION

The mouldable composition of the first embodiment of the present invention, and the mouldable composition used in the process of the second embodiment, comprises a thermoplastic polymer in order for the composition to be readily injection mouldable. Typically, the thermoplastic polymer softens above about 120° C. and is therefore of relatively low molecular weight. The injection moulding temperature is typically about 140° C. to 160° C.

Typically, the cross-linkable thermoplastic polymer has a molecular weight 40,000 to 120,000, more typically 60,000–80,000. The polymers in this range are injection mouldable at a relatively low temperature. The thermoplastic polymer also includes one or more reactive groups that make cross-linking possible using a compatible cross-linking agent. Suitable cross-linkable thermoplastic polymers are any polymeric materials bearing reactive groups capable of reacting with a suitable cross-linking agent by an addition or condensation mechanism. For example, the thermoplastic polymer may bear reactive hydroxyl groups, for cross-linking using a cross-linking agent having reactive carboxyl, ester, anhydride, aldehyde, isocyanate, epoxy or hydroxyl groups; or the thermoplastic polymer may bear reactive carboxyl groups for cross-linking using a cross-linking agent having reactive hydroxyl or amino groups; or the thermoplastic polymer may bear reactive amino groups for cross-linking using a cross-linking agent having reactive carboxyl, ester, anhydride, aldehyde, isocyanate or epoxy groups; or the thermoplastic polymer may bear reactive epoxy groups for cross-linking using a cross-linking agent having reactive hydroxyl or amino groups; or the thermoplastic polymer may bear reactive olefinic groups for cross-linking using a cross-linking agent also having reactive olefinic groups. Other examples of cross-linkable thermoplastic polymers and suitable cross-linking agents for those polymers will be readily apparent to persons of ordinary skill in the relevant art. It will be appreciated that the cross-linkable thermoplastic polymer may include more than one kind of reactive group.

In a preferred embodiment of the invention, the cross-linkable thermoplastic polymer is a poly(vinyl acetal). More preferably, the cross-linkable thermoplastic polymer is poly (vinyl butyral) or poly(vinyl formal). Typically, the butyral or formal content is in the range 75% to 85% expressed as a percentage of reactive hydroxy groups. Even more preferably, the cross-linkable thermoplastic polymer is a poly(vinyl butyral).

The primary function of the cross-linking agent is to cross-link the molecules of the thermoplastic polymer to form a three dimensional thermoset polymer network with high rigidity. When the cross-linkable thermoplastic polymer is a poly(vinyl acetal) the cross-linking agent may preferably be a melamine, diisocyanate, dialdehyde, phenolic, epoxy or urea. It is more preferred to use melamines or diisocyanates as cross-linking agents for producing the above characteristics. A particularly preferred cross-linking agent is hexamethoxymethyl melamine when the cross-linkable thermoplastic polymer is a poly(vinyl butyral). Using these cross-linking agents, cross-linking is markedly accelerated in the presence of nitrogen gas and heat.

Premature cross-linking of the cross-linkable thermoplastic polymer at the injection moulding temperature, and at the temperature at which the mouldable composition of the first embodiment is compounded, is prevented through compounding and injection moulding the mouldable composition under a nitrogen-free inert atmosphere and/or at a temperature below a temperature above which cross-linking of the thermoplastic polymer commences. Typically, cross-linking of the thermoplastic polymer commences at a temperature of at least about 140° C., more typically at least about 170° C., even more typically at least about 200° C. The rate of cross-linking is controlled by the quantity of the cross-linking agent in the mouldable composition, the temperature during removal of any plasticisers or other additives after injection moulding, and/or the application of a nitrogen atmosphere during the removal of additives. Typically, the cross-linking agent is included in the composition in an amount of from about 2.0% to 10.0%, more typically from about 6% to about 9% by weight, based on the weight of the cross-linkable thermoplastic polymer.

The mouldable composition of the first embodiment and the mouldable composition used in the process of the second embodiment may include one or more processing aids such as plasticisers, lubricants and surfactants. It will be appreciated that where the cross-linkable thermoplastic polymer is cross-linkable by a free-radical cross-linking reaction, the mouldable composition further comprises a free-radical polymerisation initiator, and optionally an activator, selected to initiate the cross-linking reaction at above the preselected temperature. Suitable initiators include dialkyl peroxides, such as di-t-butyl peroxide, and alkyl hydroperoxides, such as t-butyl hydroperoxide. Suitable amounts of free-radical polymerisation initiator depend on the chemical nature of the free-radical polymerisation and the desired polymerisation (cross-linking) temperature, and may be readily determined by persons of ordinary skill in the art with no more than routine trial and error.

The plasticiser, lubricant and/or surfactant, when used, typically melt at a temperature below a temperature at which the thermoplastic polymer cross links, or are soluble in water or an appropriate non-aqueous solvent, so that they can be melted or dissolved in water or solvent and removed after the mouldable composition has been injection moulded. Suitable plasticisers, lubricants and/or surfactants include waxes such as partially saponified montan ester wax, montanic acid wax or polyethylene wax, polytetrafluoroethylene (PTFE) and PTFE compounded with micronised wax and optionally Amide, modified polyfluo-carbons, stearic acid, oleic acid, glycols such as di- and tri-ethylene glycol, dipropylene glycol and alkoxylated glycols or related derivatives having surface-active properties, such as octyl- or nonyl-phenol ethoxylates or octyl- or nonyl-phenoxy ethanol. A surfactant, when used, activates or conditions the surface of the metal or ceramic particles to facilitate the coating of the particles with the thermoplastic polymer. A lubricant, when used, facilitates the flow of powder within the polymer. Typically, a lubricant is not miscible in the polymer.

The quantity of plasticiser used in a mouldable composition of the invention may be varied over a wide range. Typically, the quantity of plasticiser is in the range of from about 30% to about 200% by weight of the weight of the cross-linkable polymer, more typically from about 50% to about 140% by weight. The quantity of surfactant or lubricant is typically in the range of from 0% to about 20% by weight of the cross-linkable polymer, more typically from 8% to about 12%. Even more typically, the quantity of plasticiser is in the range of about 20% to about 45% by volume of the binder, the quantity of the surfactant or lubricant is in the range 3% to 5% by volume of the binder, the quantity of the crosslinkable polymer is in the range 40% to 70% by volume of the binder and the crosslinking agent is in the range 2% to 10% by volume of the crosslinkable polymer.

In contrast to prior art processes, in the process of the present invention processing aids such as plasticisers and surfactants may be selected so as to be removed from the moulded composition independently of the primary binder material, namely the cross-linkable thermoplastic polymer, conferring greater processing flexibility on the process of the present invention.

The mouldable composition of the present invention may include metal or ceramic powder, The particle size of the metal or ceramic particles in the composition of the invention is typically in the range from about 0.3 $\mu$m to about 40 $\mu$m. The shape of the particulate material can be variable and is not an important factor in the process of the present invention. The relative amount of metal or ceramic particles to binder may vary over a wide range. Typically the ratio is between 35 parts by volume of particles to about 65 parts by volume of binder, to about 80 parts by volume of particles to about 20 parts by volume of binder.

A composition of the present invention is typically compounded by being granulated before being injection moulded to the required shape. The compounding is preferably carried out under a nitrogen free inert atmosphere. During the injection moulding, the material is protected from nitrogen inside the barrel of the injection moulding machine. Thus, cross-linking of the thermoplastic polymer is avoided during the compounding and injection moulding stages. The temperature of compounding and injection moulding is preferably controlled in the region of 140 to 170° C. The material produced below 170° C. can be recycled for injection moulding without any loss of its properties. The composition of the invention typically shows excellent injection mouldability between 140 and 160° C. The temperature above which cross-linking of the thermoplastic polymer occurs, may be adjusted by the amount of cross-linking agent included in the mouldable composition.

The cross linking transforms the thermoplastic polymer to a rigid thermoset polymer through the temperature-related activation of the cross-linking reaction with the cross-linking agent. Upon cross-linking, the transformed polymer, which then behaves like a thermoset, demonstrates no softening with the increasing of the temperature. The rigidity of the polymer increases progressively with temperature above the cross-linking temperature conferring excellent shape retention on the moulded composition while any low molecular weight processing aids such as plasticisers, lubricants or surfactants are removed from the composition. The rigid transformed polymer continues to retain its shape as the temperature is raised, while the particles of the metal or ceramic powder begin to form necks between each other providing absolute shape stability. During this stage, the thermoset polymer which has formed typically begins a degradation process into gaseous products and eventually decomposes entirely into gaseous products, as the temperature is raised further, without undergoing a phase of melting.

Thus, the moulded part is assured of excellent and absolute shape retention throughout the binder removal process. The decomposition of the polymer leaves no residual products that can contaminate the moulded object.

Best Mode and Other Modes of Carrying Out the Invention

A typical mouldable composition in accordance with the first embodiment of the invention comprises 35–80% by volume of a metal or ceramic powder and 65–20% by volume of binder consisting of 70–40 parts by volume of cross-linkable thermoplastic polymer, 2–10 parts by volume of cross-linking agent, 20–45 parts by volume of plasticiser and 3–5 parts by volume of a surfactant.

A more typical mouldable composition in accordance with the first embodiment of the invention comprises 40–60% by volume of a metal or ceramic powder and 60–40% by volume of binder consisting of poly(vinyl butyral), from 0.06 to 0.09 parts by weight of hexamethoxymethyl melamine, based on the weight of poly(vinyl butyral), from 0.5 to 1.4 parts by weight of partially saponified montanic ester, based on the weight of poly(vinyl butyral), and from 0.08 to 0.12 parts by weight of stearic acid, based on the weight of poly(vinyl butyral).

In a typical process in accordance with the second embodiment of the invention, mouldable composition according to the invention comprising 35–80% by volume of a metal or ceramic powder and 65–20% by volume of binder consisting of 70–40 parts by volume of cross-linkable thermoplastic polymer, 2–10 parts by volume of cross-linking agent, 20–45 parts by volume of plasticiser and 3–5 parts by volume of a surfactant/lubricant are compounded at a temperature in the range of 140 to 170° C. in a nitrogen-free atmosphere, typically argon.

The mouldable composition is then injection moulded at the first temperature in the range of 140 to 170° C. to form a moulded green part. In the injection moulding step, in which the mouldable composition of the invention is typically not in contact with nitrogen gas, the temperature is insufficient to initiate substantial cross-linking of the thermoplastic polymer. The moulded green part is typically subjected to binder removal as follows.

The plasticiser and surfactant are melted away from the part through slow and progressive increase of temperature in the range of 40° C. to 280° C., typically under a nitrogen gas atmosphere.

The cross-linking agent in the mouldable composition initiates cross-linking of the thermoplastic polymer during the temperature increase in the range of 140° C. to 280° C. catalyzed and accelerated by the nitrogen gas environment above 140° C. That is, in the presence of nitrogen gas, the cross-linking typically occurs at a temperature lower than in the absence of nitrogen gas.

During this activation period, the relatively soft thermoplastic polymer changes its characteristic through cross-linking to that of a thermoset polymer thus increasing in rigidity. The increase in rigidity due to this transformation results in excellent shape retention of the polymer, and thus of the moulded part. This is of extreme importance in preventing any collapsing of the metal or ceramic powder or deformation of the part. The absolute shape retention provided through the backbone polymer that is now a thermoset is of importance to provide extreme end product accuracy in dimensions and contours.

After removal of any plasticiser(s) and/or surfactant(s), at a third temperature in the range of about 380 to 480° C., neck formation between the powder particles begins and the shape retention is now progressively provided more by a network of inter particle necks that are formed, rather than by the strength of the rigidified polymer. At this stage the function of the rigidified polymer is complete.

Also in the temperature range of from 380° C. to 480° C., the polymer gradually begins to degrade, without softening or melting, into lower molecular weight gaseous products which are purged away from the moulded part. Elevating the temperature of the part further, to the range of 480° C. to 600° C., completes degradation of the polymer into gases which are purged away from the binder-free body. At this point, all of the polymer is removed from the part without leaving residual products. The temperature is further elevated to the sintering temperature of the metal or ceramic material, typically above 1100° C., where the product is fully sintered into a solid body of density above 98% of the theoretical density.

FIG. 1 illustrates in graphical format a typical temperature-time heating profile used in a process of the present invention. Total time taken for the complete removal of the binder materials is reduced to 12 to 14 hours. This may be compared to prior art processes in which soft thermoplastic polymer deforms under the pressure of melting and evaporating. Plasticiser and surfactant require very slow heating to reduce such pressures, and binder removal times in excess of 16 to 20 hours or more are typically reported for prior art processes.

The present invention provides a number of advantages in comparison to the prior art. Firstly, since the softening character of the polymer is eliminated in the mouldable composition of the present invention, and the degradation of the polymer occurs at a higher temperature where neck formation can take place between particles of the metal or ceramic powder, thus assuring absolute shape retention, the use of much more economical coarser powders, typically up to 40 $\mu$m, is facilitated by the process of the present invention in contrast to the more expensive (less than about 10 $\mu$m) powders of the prior art processes. Since the shape retention is completely established without being influenced by the shape of the powder particle the present invention makes the system independent of the shape of the powder particles and expands the size from sub-micron (typically 0.3 $\mu$m) sizes to 40 $\mu$m.

Further, the present invention provides a binder composition which may be used with both metal and ceramic particles.

In addition, the present invention provides a more flexible process for forming moulded green parts for production of sintered metal or ceramic objects, by providing a greater choice of metal or ceramic particle loadings and processing temperatures, and for providing for the removal of relatively low molecular weight processing aids such as plasticisers, lubricants and surfactants, independently of removal of the polymeric binder material. For example, in prior art processes the volume ratio of metal or ceramic powder to total volume of the composition is typically in the range of by 50–65% by volume, whereas in the present process may be in the range of 35 to 80% by volume.

EXAMPLES

The following examples are provided to illustrate the invention, but are not to be construed as in any way limiting the invention.

Example 1

5000 g of 316L Stainless Steel powder of average particle size 30 $\mu$m was compounded with 262 g of poly(vinyl butyral), 17 g of hexamethoxymethyl melamine (cross-linker), 362 g of polyethylene glycol, and 25 g of stearic acid to a homogeneous feedstock in a planetary mixer. The green parts were moulded using the feedstock in an injection moulding machine. The glycol in the parts was then dissolved in water at 80° C. The dried parts were then heated in a nitrogen carrier gas to a temperature above 280° C. activating the cross-linking agent and transforming the poly (vinyl butyral) to a rigid polymer offering absolute shape retention. The nitrogen gas catalyzed the transformation of the thermoplastic poly(vinyl butyral) into a rigid thermoset polymer assuring the shape retention of the part. The temperature was further increased to 380° C. in which temperature range, the gradual degradation of the polymer and neck formation between the metal powder particles began. The temperature was further increased to 480° C. at which temperature the thermoset polymer was completely decomposed into gaseous products which were removed by the carrier gas nitrogen. The temperature was further elevated to 1360° C. to produce a solid stainless steel body of density 98.9% of the theoretical.

Example 2

4500 g of Alumina powder and 135 g of Magnesium Oxide powder of average particle size 1.6 $\mu$m was blended and compounded with 248 g of poly(vinyl butyral), 21 g of hexamethoxymethyl melamine (cross-linker), 260 g of partially saponified montanic ester (plasticiser), 20 g of octylphenoxyethanol (surfactant) into a homogeneous feedstock.

Green bodies were moulded using the feedstock and were subjected to progressive increase in temperature under a nitrogen atmosphere to melt away the plasticiser while activating the cross-linking of the thermoplastic poly(vinyl butyral) polymer into a rigid thermoset plastic polymer in the temperature range of 120° C. to 280° C. The temperature was progressively increased above 380° C. At these temperatures the degradation of the rigid polymer was completed and the neck formation between the powder particles began. The temperature was further increased to 480° C. at which temperature the polymer was completely degraded into gaseous products which were entrained and removed with the nitrogen carrier gas. The parts were subsequently sintered at 1490° C. to form solid alumina ceramic bodies.

Example 3

5000 g of 316L stainless steel powder of average particle size 30 $\mu$m was compounded in a planetary mixer with 230 g of poly(vinyl butyral), 18 g of hexamethoxymethyl melamine (cross-linker), 207 g of partially saponified montanic ester (plasticiser) and 24 g of stearic acid into a homogeneous feed stock. The feedstock was injection moulded to form the green bodies using an injection moulding machine. The temperature of the green bodies was increased progressively from 120° C. to 180° C. under nitrogen gas to melt away the plasticiser and to initiate the cross-linking of the polymer. The temperature was further increased to 280° C. to complete the cross-linking. The temperature was further increased to 380° C. and then to 480° C. At this temperature the rigid polymer was completely degraded into gaseous products and necks were formed between the powder particles. The parts were sintered at 1360° C. to a density of 99% of the theoretical.

Example 4

6000 g (769 cc) of 316L stainless steel powder of average particle size 32 mm was compounded with 1270 g (1154 cc)

of binder, amounting to a volume loading of 40% metal powder, under argon into a homogeneous feedstock. The binder consisted of 762 g of poly (vinyl butyral), 381 g of partially saponified montanic ester (plasticiser), 63 g of octylphenoxyethanol (surfactant) and 54 g of hexamethoxymethyl melamine (cross-linker).

The feedstock was injection moulded to green objects using a plastic injection moulding machine. The temperature of the green bodies were increased progressively from 120° C. to 180° C. under nitrogen gas during which cross-linking is initiated and then to 280° C. to complete cross-linking. When this temperature has been reached the plasticiser and the surfactant have left the green body. The temperature is further increased to 380° C. and then to 480° C. and subsequently to the sintering temperature of 1350° C. The sintered body showed excellent shape retention and a shrinkage of 22% from the green stage to the sintered stage. The sintered density of the body was 98.7% of the theoretical.

Example 5

FIG. 1 illustrates in graphical format a typical time-temperature heating profile used in a process of the present invention. Referring to FIG. 1, the temperature of a moulded green part of the invention is raised at (1) at a rate of 100° C. per hour to a temperature of 120° C., where it is held at (2) for two hours. During this time, plasticiser and any other low-melting additive separates from the moulded green part and is removed from it. At (3) the temperature of the moulded green part is raised at 35–40° C. per hour to 180° C. and held there for one hour at (4). During this time, removal of plasticiser and other low-melting additive(s) is completed. At (5) the temperature is raised at 45–50° C. per hour to 280° C., at which it is held for 30 minutes at (6). During heating step (5) and holding step (6) cross-linking of the cross-linkable thermoplastic polymer occurs to form a thermoset polymer which confers rigidity on the moulded green part. At the end of the hold time at 280° C., the moulded green part is heated at (7) at a rate of 65–70° C. per hour to 380° C., and is held at that temperature for 30 minutes at (8). During the heating step (7) and the holding step (8) neck formation between particles of metal or ceramic in the mouldable composition commences. Subsequently, the temperature is further raised at (9) at a rate of 80–90° C. per hour to 480° C., during which the thermoset polymer begins to degrade with the formation of gaseous degradation products. The temperature of the moulded part is held at (10) for 30 minutes at 480° C. At the end of this time, the temperature is raised at 100–120° C. per hour (11) to a final temperature (not shown) in the range of 1300–1500° C. to sinter the metal or ceramic particles present in the moulded part and to complete degradation of the thermoset polymer into gaseous product.

The foregoing examples clearly demonstrate that the present invention provides a unique method to manufacture high precision metal components eliminating the problems and the defects associated with the prior art. The defects and problems in the prior art which are due to the softening of the thermoplastic backbone polymers with increase in temperature for binder removal is eliminated through the use of the cross-linker which transforms the thermoplastic polymer into a rigid thermoset polymer during the binder removal.

What is claimed is:

1. A mouldable composition for use in manufacturing a sintered metal or ceramic object, said composition comprising a mixture of a metal or ceramic powder, a cross-linkable thermoplastic polymer, an amount of a cross-linking agent effective to cross-link said thermoplastic polymer at an elevated temperature, and a plasticizer or surfactant or both a plasticizer and surfactant, wherein said cross-linking agent is ineffective to cross-link said thermoplastic polymer below said elevated temperature.

2. A mouldable composition according to claim 1, wherein said cross-linkable thermoplastic polymer is a poly (vinyl acetal).

3. A mouldable composition according to claim 2, wherein said poly(vinyl acetal) is poly(vinyl butyral) or poly(vinyl formal).

4. A mouldable composition according to claim 2, wherein said cross-linking agent is a melamine or a diisocyanate.

5. A mouldable composition according to claim 4, wherein said cross-linkable thermoplastic polymer is poly (vinyl butyral) and said cross-linking agent is hexamethoxymethyl melamine.

6. A mouldable composition according to claim 1, wherein said metal or ceramic powder has a particle size range of from 0.3 µm to 40 µm.

7. A moulded green part comprising a mouldable composition of claim 1.

* * * * *